(12) United States Patent
Arcedera et al.

(10) Patent No.: US 8,010,740 B2
(45) Date of Patent: Aug. 30, 2011

(54) OPTIMIZING MEMORY OPERATIONS IN AN ELECTRONIC STORAGE DEVICE

(75) Inventors: Mark I. Arcedera, Paranaque (PH); Ritchie Babaylan, Cavite (PH); Reyjan Lanuza, Gen. T. De Leon Valenzuela (PH)

(73) Assignee: BiTMICRO Networks, Inc., Fremont, CA (US)

( * ) Notice: Subject to any disclaimer, the term of this patent is extended or adjusted under 35 U.S.C. 154(b) by 181 days.

(21) Appl. No.: 12/323,461

(22) Filed: Nov. 25, 2008

(65) Prior Publication Data
US 2009/0077306 A1 Mar. 19, 2009

Related U.S. Application Data

(63) Continuation-in-part of application No. 11/450,005, filed on Jun. 8, 2006, now Pat. No. 7,506,098.

(51) Int. Cl.
*G06F 12/00* (2006.01)
(52) U.S. Cl. ......................... 711/103; 711/203
(58) Field of Classification Search ............. 711/103; 771/203
See application file for complete search history.

(56) References Cited

U.S. PATENT DOCUMENTS

| | | | |
|---|---|---|---|
| 2003/0217202 A1* | 11/2003 | Zilberman et al. | 710/22 |
| 2005/0114587 A1* | 5/2005 | Chou et al. | 711/103 |
| 2009/0300318 A1* | 12/2009 | Allen et al. | 711/206 |

OTHER PUBLICATIONS

Lee W. Young, PCT/US07/70660 International Search Report (ISR), Nov. 18, 2008, p. 2, International Searching Authority/US, Alexandria, Virginia.
Lee W. Young, PCT/US07/70660 Written Opinion (WO), Nov. 18, 2008, Box V and Supplemental Box, International Searching Authority/US, Alexandria, Virginia.

* cited by examiner

*Primary Examiner* — Hashem Farrokh
(74) *Attorney, Agent, or Firm* — Stephen R. Uriarte

(57) ABSTRACT

To optimize memory operations, a mapping table may be used that includes: logical fields representing a plurality of LBA sets, including first and second logical fields for representing respectively first and second LBA sets, the first and second LBA sets each representing a consecutive LBA set; PBA fields representing PBAs, including a first PBA disposed for representing a first access parameter set and a second PBA disposed for representing a second access parameter set, each PBA associated with a physical memory location in a memory store, and these logical fields and PBA fields disposed to associate the first and second LBA sets with the first and second PBAs; and, upon receiving an I/O transaction request associated with the first and second LBA sets, the mapping table causes optimized memory operations to be performed on memory locations respectively associated with the first and second PBAs.

40 Claims, 2 Drawing Sheets

| Logical Fields 26 | PBA Fields 28 | | | |
|---|---|---|---|---|
| | Access Parameter Fields 30 | | | Memory Index Fields 32 |
| | Bus Id Fields 34 | FDE Id Fields 36 | Group Id Fields 38 | |
| LBAs 00-07 | 8-0 | 22-01 | 15-0 | 0x00 |
| LBAs 08-15 | 8-0 | 22-02 | 15-1 | 0x08 |
| LBAs 16-23 | 8-1 | 22-11 | 15-0 | 0x00 |
| LBAs 24-31 | 8-1 | 22-12 | 15-1 | 0x08 |
| ⋮ | ⋮ | ⋮ | ⋮ | ⋮ |
| ⋮ | ⋮ | ⋮ | ⋮ | ⋮ |

| Logical Fields 26 | PBA Fields 28 | | | Memory Index Fields 32 |
|---|---|---|---|---|
| | Access Parameter Fields 30 | | | |
| | Bus Id Fields 34 | FDE Id Fields 36 | Group Id Fields 38 | |
| LBAs 00-07 | 8-0 | 22-01 | 15-0 | 0x00 |
| LBAs 08-15 | 8-0 | 22-02 | 15-1 | 0x08 |
| LBAs 16-23 | 8-1 | 22-11 | 15-0 | 0x00 |
| LBAs 24-31 | 8-1 | 22-12 | 15-1 | 0x08 |
| ⋮ | ⋮ | ⋮ | ⋮ | ⋮ |
| ⋮ | ⋮ | ⋮ | ⋮ | ⋮ |

*FIG. 2*

OPTIMIZING MEMORY OPERATIONS IN AN ELECTRONIC STORAGE DEVICE

CROSS-REFERENCE TO RELATED APPLICATIONS

This application is a continuation in part application and claims the benefit of U.S. patent application Ser. No. 11/450,005, filed 8 Jun. 2006, entitled "Optimized Placement Policy for Solid State Storage Devices, now U.S. Pat. No. 7,506,098, which is hereby incorporated by reference as if fully set forth herein.

FIELD OF INVENTION

The present invention relates to solutions for optimizing memory operations in a memory system suitable for use in an electronic storage device. More particularly, the present invention relates to solutions for increasing the likelihood that the operational load imposed on the memory system by these memory operations, performed in response to an I/O transaction request, will be optimally distributed across resources used by the memory system, increasing operational efficiency, reducing memory operation latency or both.

BACKGROUND

Electronic storage devices that respectively employ a memory system that includes memory devices, memory chips, or modules that use non-volatile memory cells are commonly known and are sometimes referred to as solid state storage devices. The computer device industry has increased the adoption of these solid state storage devices due to certain advantages offered by these types of storage devices over other forms of storage devices, such as rotational drives. The adoption of solid state storage devices as an enhancement or even as replacements to rotational drives is not without some difficulty because many conventional computer devices, sometimes referred to as "hosts", use host operating systems, file systems, or both that are optimized for use with rotational drives rather than solid state storage devices. For example, unlike rotational drives, solid state storage devices that use NAND flash memory, also referred to as "flash drives", suffer from write cycle limitations and to a certain degree, bad blocks. In addition, flash drives use block addressing rather than byte addressing, and these flash drives use block addresses that are usually much larger than the block address used by the host. Block addressing may impose an additional level of complexity and additional processing cycles when performing a write operation, and which in turn, may increase write operation latency. This additional level of complexity may include performing a read-modify-write transaction to complete the write operation.

Many conventional host operating and file systems, however, do not employ mechanisms to solve these write cycle, bad block, or block level addressing issues. Consequently, flash drive manufacturers sometimes employ, at the storage device level, flash memory related techniques that include read-modify-write transactions, wear leveling, bad block management or any combination of these to minimize or manage the write cycle limitation and bad blocks common to flash drives. Other host file systems, such as file systems that employ a write in place method, might use a "flash translation layer" to avoid excessive wear to a particular block of flash memory.

The use of these flash memory related techniques at the storage device level, or a flash translation layer at the host level, however, may decrease storage device performance, increase transaction or memory operation latency, or render the storage device as a primary bottleneck to the processing efficiency of a host or a computing network. In response, some solid state storage device manufacturers have implemented "brute force" or active solutions that include using more complex algorithms and "faster" processing devices, such as CPUs, to handle and process these algorithms. These active solutions, however, increases device costs and in most cases, design complexity.

Consequently, a need exists for a solution that optimizes memory operations performed by or in an electronic storage device with a relatively minimal increase in device complexity and costs. These optimizing memory operations include increasing the likelihood that, in response to an I/O transaction initiated by a host, the operational load imposed on the storage device by these memory operations will be optimally distributed across different storage device resources, such as by interleaving or parallel memory operations, reducing memory operation latency, increasing operational device efficiency, or both.

SUMMARY

Solutions for optimizing memory operations performed by or in an electronic storage device in response to receiving an I/O transaction request initiated by a host are disclosed. In one implementation, a mapping table is used and disposed to include: a set of logical fields, including a first logical field and a second logical field, with these logical fields respectively disposed for representing a plurality of LBA sets, including the first logical field disposed for representing a first LBA set and the second logical field disposed for representing a second LBA set, the first and second LBA sets each representing a set of consecutive LBAs. The mapping table further includes a set of PBA fields, including a first PBA field and a second PBA field, with these set of PBA fields respectively disposed for representing a set of PBAs, including a first PBA disposed for representing a first set of access parameters and a second PBA disposed for representing a second set of access parameters, with these PBAs each associated with a physical memory location in a memory store, and these set of logical fields and set of PBA fields disposed to associate the first and second LBA sets with the first and second PBAs; and wherein, in response to receiving the I/O transaction request, the mapping table causes the storage device to perform optimized memory operations on memory locations respectively associated with the first and second PBAs, if the I/O transaction request is associated with the first and second LBA sets.

BRIEF DESCRIPTION OF DRAWINGS

FIG. 2 is a mapping table for an electronic storage device, such as the electronic storage device illustrated in FIG. 1, in accordance with another embodiment of the present invention.

DETAILED DESCRIPTION OF THE INVENTION

Figure 1:
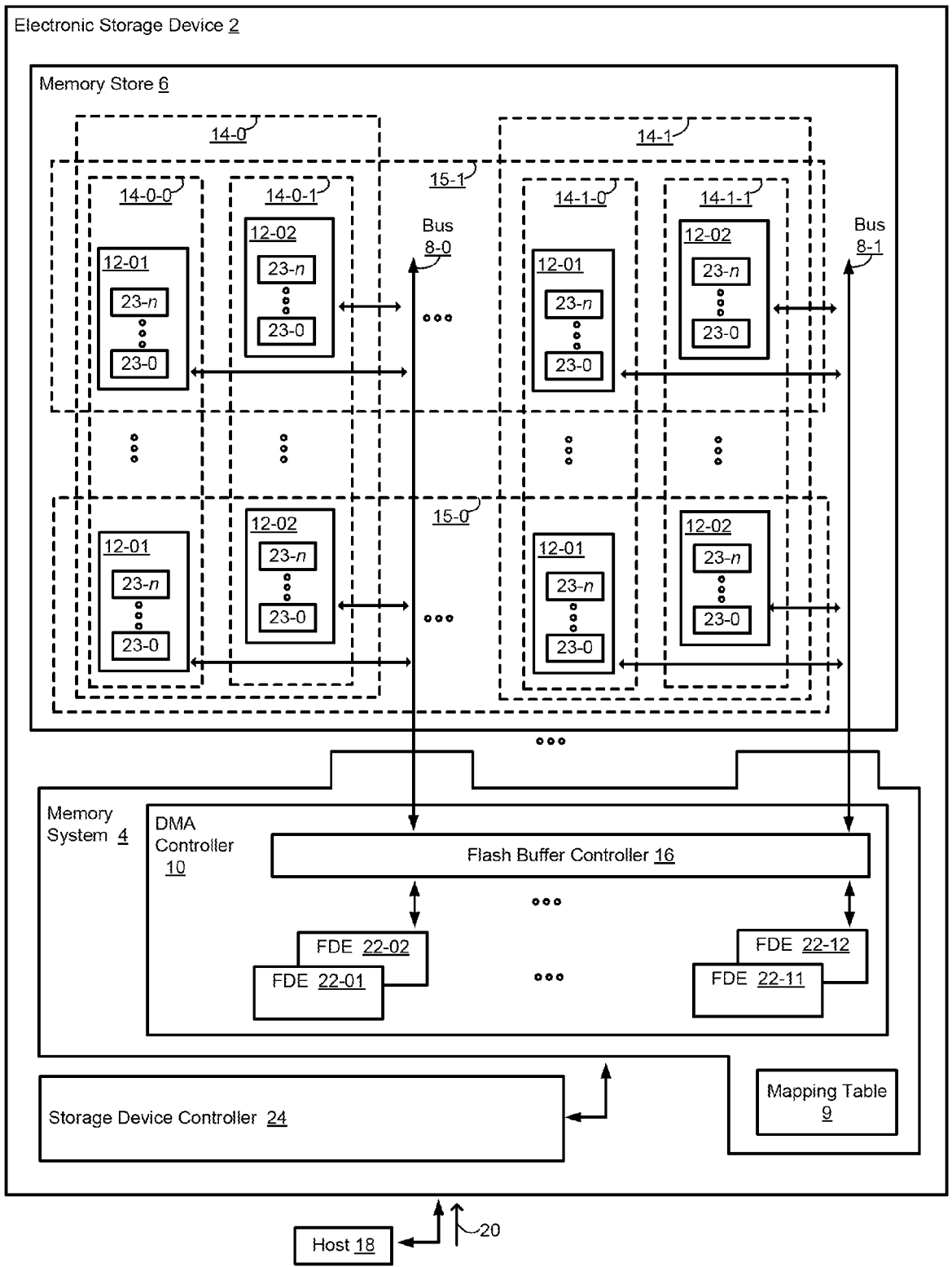
FIG. 1 is a block diagram of an electronic storage device that includes a memory system which uses a memory table for increasing the likelihood that optimized memory operations will be performed in accordance with one embodiment of the present invention.

For clarity purposes, not all of the routine features of the embodiments described herein are shown or described. It is appreciated that in the development of any actual implementation of these embodiments, numerous implementation-specific decisions may be made to achieve a developer's specific goals. These specific goals will vary from one implementation to another and from one developer to another. This development effort might be complex and time-consuming but would nevertheless be a routine engineering undertaking for those of ordinary skill in the art having the benefit of this disclosure. In addition, the elements used in the embodiments described herein may be referred to using the variable symbol n, which is intended to reflect any number greater than one (1).

The various embodiments of the present invention disclosed herein relate to solutions for optimizing memory operations in a memory system suitable for use in an electronic storage device. More particularly, the present invention pertains to solutions that increase the likelihood which, in response to an I/O transaction initiated by a host, the operational load imposed on the memory system by these memory operations will be optimally distributed across resources used by the memory system, reducing memory operation latency, increasing operational device efficiency, or both. This memory system, such as memory system 4, may be used with or implemented in an electronic storage device 2, in the manner illustrated in FIG. 1 in accordance with one embodiment of the present invention. Memory system 4 is coupled to a memory store 6 via a set of buses, such as buses 8-0 and 8-1, and uses a mapping table 9. Memory system 4 also includes a DMA controller 10 that includes a flash buffer controller 16 and a set of direct memory access engines, which are suitable for performing DMA operations on memory devices used by memory store 6.

When designed to operate with flash memory devices, these direct memory access engines may be also herein referred to as FDEs, and in the example shown in FIG. 1, are illustrated as FDEs 22-01, 22-02, 22-11 and 22-12. An FDE represents a device that is capable of controlling a flash memory device and performing DMA operations on the flash memory device in response to commands generated by storage device 2 through storage device controller 24. These DMA operations include facilitating high speed data transfers to and from memory devices that are included as part of memory store 6, such as flash memory devices 12-01 and 12-02. Buses 8-0 and 8-1 respectively function as a bus interface that is used by an FDE to control and communicate with selected flash memory devices in memory store 6. For example, bus 8-0 may be used by FDE 22-01 to control flash memory devices, such as flash memory devices 12-01, that are coupled to bus 8-0 and that have chip enables (not shown) which are controllable by FDE 22-01, while bus 8-1 may be used by FDE 22-11 to control flash memory devices, such as flash memory devices 12-01, that are coupled to bus 8-1 and that have chip enables (not shown) which are controllable by FDE 22-11. In another example, bus 8-0 may be used by FDE 22-02 to control flash memory devices, such as flash memory devices 12-02, that are coupled to bus 8-0 and that have chip enables which are controllable by FDE 22-02, while bus 8-1 may be used by FDE 22-12 to control flash memory devices, such as flash memory devices 12-02 in flash, that are coupled to bus 8-1 and that have chip enables which are controllable by FDE 22-12.

DMA controller 10 also includes a flash buffer controller 16. Flash buffer controller 16 is disposed to drive each bus utilized by memory system 4 and to translate command signals asserted by FDEs 22-0 through 22-12 into native memory device commands that are compatible with the memory device selected to receive these commands. In the example shown in FIG. 1, these memory device commands are in the form of native flash memory device commands. The number of buses, flash memory devices and FDEs shown in FIG. 1 are not intended to be limiting in any way and may be selected according to a variety of factors, such as the performance, cost, capacity and any combination of these which may be desired.

One of ordinary skill in the art having the benefit of this disclosure would readily recognize that DMA controller 10 may be implemented using a different configuration disclosed herein and may include other types of processors, DMA engines, or equivalent components. The term "host" means any device that can initiate an I/O transaction request which can be received by an electronic storage device that is targeted for receiving the I/O transaction request. For example, in FIG. 1, host 18 can initiate an I/O transaction request 20, which is received and processed by storage device 2 as described herein.

Storage device 2 represents any storage device that may be used with the optimized memory operation solutions and embodiments disclosed herein. For example, storage device 2 may be further configured to include a processing unit, such as a CPU, a bus, a working memory, such as DRAM, and an I/O interface, which may be in the form of a SATA, iSCSI, SATA, Fibre Channel, USB, eSATA interfaces, a network adapter, a PCI or PCI-e bus bridge, or the like. These storage device components enable storage device 2 to execute an embedded operating system (not shown) necessary for processing I/O transactions that are initiated by a host through a suitable network, and that are eventually received and processed by storage device 2 through various device resources, including memory system 4, buses 8-0 and 8-1, and memory store 6. The processing unit, bus, DRAM, embedded operating system, and I/O interface are generally known, and thus, are hereinafter referred to and shown collectively in the form of a storage device controller 24 to avoid over complicating the herein disclosure. In addition, although DMA controller 10 is shown as a separate component device in FIG. 1, DMA controller 10 may be integrated with any other component employed by a storage device and thus, the form factor of DMA controller 10 is not intended to be limiting in any way. For example and although not shown in FIG. 1, DMA controller 10 may be part of or integrated within a storage device controller that has a function similar to storage device controller 24.

In another example, DMA controller 10 may be implemented in the form of Flash DMA controller 109, which is part of hybrid storage controller 102, which are further disclosed in FIG. 1 of United States patent application Ser. No. 11/450,023, filed on 8 Jun. 2006, entitled "Hybrid Multi-Tiered Caching Storage System", now U.S. Pat. No. 7,613, 876, which is hereby incorporated by reference as if fully set forth herein.

Memory store 6 may be configured to include a set of solid state memory devices that are coupled to a set of buses and that are controlled by a set of FDEs. In FIG. 1, these memory devices, buses, and FDEs are implemented in the form of flash memory devices 12-01 and 12-02; buses 8-0 and 8-1; and FDEs 22-01, 22-02, 22-11, and 22-12, respectively. The term "flash memory device" is intended to include any form of non-volatile memory, including those that use blocks of non-volatile memory cells, named flash blocks. Each memory cell may be single or multi-level. In FIG. 1, flash blocks 23-0 through 23-*n* are shown for each flash memory device illustrated. In addition, the number of flash memory devices, bus interfaces, and FDEs illustrated in FIG. 1 is not intended to be limiting in any way. Instead, the number of these devices may be increased or decreased, depending on the performance, cost and storage capacity desired.

A flash memory device permits memory operations, such as a write or read operation, to be performed on these flash blocks according to a protocol supported by the flash memory device. A flash memory device may be implemented using a flash memory device that complies with the Open NAND Flash Interface Specification, commonly referred to as ONFI Specification. The term "ONFI Specification" is a known device interface standard created by a consortium of technology companies, called the "ONFI Workgroup". The ONFI Workgroup develops open standards for NAND flash memory devices and for devices that communicate with these NAND flash memory devices. The ONFI Workgroup is headquartered in Hillsboro, Oreg. Using a flash memory device that complies with the ONFI Specification is not intended to limit the embodiment disclosed. One of ordinary skill in the art having the benefit of this disclosure would readily recognize that other types of flash memory devices employing different device interface protocols may be used, such as protocols compatible with the standards created through the Non-Volatile Memory Host Controller Interface ("NVM-HCI") working group. Members of the NVMHCI working group include Intel Corporation of Santa Clara, Calif., Dell Inc. of Round Rock, Tex. and Microsoft Corporation of Redmond, Wash.

Mapping table 9 may be implemented in the manner shown in FIG. 2, which is discussed below in conjunction with FIG. 1. Mapping table 9 includes a set of fields, named logical fields 26, and a set of PBA fields 28. Each PBA field from set of PBA fields 28 is disposed to represent a unique addressable physical memory location, named "PBA, in memory store 6, such as PBA 46, 48, 50 or 51. For each PBA field, this physical memory location may be represented by using a set of access parameter fields 30 and a memory index field 32. The set of access parameters fields 30 includes a bus identifier field 34, a FDE identifier field 36, and a group identifier field 38.

Bus identifier field 34 is disposed to represent a bus identifier, which is an identifier that is used for representing a bus interface, such as bus 8-0 or 8-1. FDE identifier field 36 is disposed to represent a FDE identifier, which is an identifier for identifying one FDE from another FDE from a set of FDEs that are coupled to the same bus interface. The forms of the bus and FDE identifiers are not intended to be limiting in any way as long as the bus identifiers and FDE identifiers employed enable the selection of a specific bus from a set of buses, and the selection of a specific FDE from a set of FDEs that are coupled to the same bus via flash buffer controller 16. Flash memory devices coupled to the same bus may be hereinafter referred to as a flash array bank. For example, flash memory devices 12-01 and 12-02 that are coupled to bus 8-0 are in a flash array bank 14-0, while flash memory devices 12-01 and 12-02 that are coupled to bus 8-1 are in a flash array bank 14-1.

Flash memory devices that are controlled by the same FDE may be hereinafter referred to as a flash array bank interleave. For instance, in flash array bank 14-0, flash memory devices 12-01 are controlled by FDE 22-01 and are thus, in one flash array bank interleave 14-0-0, while flash memory devices 12-02 are controlled FDE 22-02 and are thus, in another flash array bank interleave, such as flash array bank interleave 14-0-1. Similarly, in flash array bank 14-1, flash memory devices 12-01 are controlled by FDE 22-11 and are thus, in flash array bank interleave 14-1-0, while flash memory devices 12-02 are controlled FDE 22-12 and are thus, in flash array bank interleave 14-1-1. Selection of a flash memory device may be provided by coupling the chip select line (not shown) of the flash memory device to a FDE.

Group identifier field 38 is disposed to represent a group identifier, which is an identifier for identifying one flash memory device from another flash memory device from a set of flash devices that are controlled by the same FDE. For example, in flash array bank interleave 14-0-0, since flash memory devices 12-01 are controlled by FDE 22-01, each of these flash memory devices are represented using different group identifiers, such as group identifiers 15-0 and 15-1.

Group identifiers are selected and assigned to flash memory devices so that no more than one flash memory device, which is within the same flash array bank interleave or which is controlled by the same FDE, is associated with the same group identifier. Flash memory devices may share the same group identifier as long as these flash memory devices are not controlled by the same FDE. In the example embodiment in FIG. 1, flash memory devices 12-01 and 12-02 share the same group identifier, such as group identifier 15-0 or 15-1, because these flash devices are controlled by different FDEs, such as FDEs 22-01 or 22-02, respectively.

In FIG. 2, mapping table 9 reflects the embodiment disclosed in FIG. 1. PBA 46 and PBA 50 include access parameters that are associated with the same group identifier of 15-0 but pertain to physical memory locations within different flash memory devices in memory store 6. These access parameters are associated with different FDE identifiers, such as FDE identifiers 22-01 and 22-11 and with different bus identifiers 8-0 and 8-1, respectively. Using their respective access parameters, PBA 46 is associated with a physical memory location that is within a flash memory device 12-01 coupled to bus 8-0, controlled by FDE 22-01, and in group 15-0, while PBA 50 is associated with another physical memory location that is within a flash memory device 12-01 coupled to bus 8-1, controlled by FDE 22-11, and in group 15-0 in FIG. 1.

The term "LBA", which may also be referred to herein as a logical block address, is intended to represent an address that is part of a logical addressing system (not shown) used by a host, such as host 18, and this host may use one or more LBAs in an I/O transaction request, such as I/O transaction request 20. Mapping table 9 associates LBAs from this host logical addressing system to the device addressing system used by storage device 2. This device addressing system may include using a mapping table that includes the functionality described herein, such as mapping table 9. These LBAs may be grouped into sets of consecutive LBAs, named "LBA sets". These LBA sets may then be represented using logical fields 26 from mapping table 9, where each logical field in set of logical fields 26 is respectively disposed to represent a LBA set. For example, LBA sets 40, 42, 44, and 45 may be used to respectively represent consecutive LBAs used by host 18, such as LBAs 00 through 07, LBAs 08 through 15, LBAs 16 through 23, and LBAs 24-31, respectively.

Logical fields in mapping table 9 may be initialized to represent LBA sets that are serially arranged in mapping table 9 so that LBAs from adjacent LBA sets are contiguous. In the example shown in FIG. 2, LBA sets 40, 42, 42, 44 and 45 represent serially arranged LBAs since the highest LBA in one LBA set is contiguous with the lowest LBA in an adjacent LBA set. Specifically, LBA sets 40 and 42 are disposed in adjacent rows and thus are adjacent to each other. These adjacent LBA sets are also contiguous because LBA 7, which corresponds to the highest LBA in LBA set 40, is contiguous with LBA 8, which is the lowest LBA in LBA set 42. Similarly, LBA sets 42 and 44 are also contiguous because LBA 15, which corresponds to the highest LBA in LBA set 42, is contiguous with LBA 16, which is the lowest LBA in LBA set 44. LBA set 44 is also contiguous with LBA set 45.

In addition, storage device 2 initializes mapping table 9 by creating an association between these LBA sets and PBAs so that adjacent LBA sets are mapped to PBAs, and any two adjacent PBAs differ by at least one access parameter. The term "two adjacent PBAs" is intended to include any two PBAs that are respectively mapped to adjacent LBAs in mapping table 9. This mapping association among LBA sets and PBAs increases the likelihood that memory operations resulting from an I/O transaction request will be optimized because if these memory operations involve data accesses associated with contiguous LBA sets these data accesses will in likelihood occur on different PBAs. This results in the likelihood that different storage resources will be used, such as different buses, different FDEs, different groups or any combination of these, which provides a form of interleaving by bus, FDE, flash memory device group or any combination of these.

Each LBA set also includes a LBA set size, which is a function of the number of LBAs used in each LBA set and the LBA size of each LBA. For example, each LBA set may be associated with eight LBAs and if each LBA has an LBA size equal to 512 bytes, then LBA set 40 has an LBA set size of 4 Kilobytes (KB). If a flash block within a given flash memory device has a block size of 16 KB, an LBA set size of 4 KB would permit a maximum of four PBAs that can be mapped to this flash block. Similarly, if a flash block has a flash block size of 32 KB, an LBA set size of 4 KB would permit a maximum of eight PBAs that can be mapped to this flash block. In the example shown in FIG. 2, the LBA set size selected is set equal to a section size (not illustrated in figure). The term "section size" is the size of the minimum portion in which data may be transferred or relocated between physical memory locations in memory store 6. In addition, the section size may be limited to a size that is at least equal to the product of a positive integer multiplied by the native page size used by a flash block. For example, if the native page size for flash block 23-0 is 4 KB, then the section sizes that may be used would be limited to 4 KB, 8 KB, 12K, and so on.

In an alternative embodiment, if a flash memory device supports more than one page write cycle that can be performed on a page before requiring an erase cycle to be performed on the flash block containing the page, then the section size may be set to a size that is at least equal to the quotient that results from dividing the native page size of the flash block by the number of page writes supported by the flash memory device. For example, if flash block 23-0 from flash memory device 12-01 supports two page writes on a page before requiring an erase cycle on flash block 23-0 and the flash block 23-0 has a native page size of 4 KB, then the section size may be set at least equal to 2 KB. Since the LBA set size selected is equal to the section size, in this alternative embodiment, the LBA set used would have an LBA set size of 2 KB.

Besides access parameter field 30, each PBA field also includes a memory index field 32, which may be used to represent a memory index, such as 0x00 or 0x08 in FIG. 2. Each memory index represents the starting address boundary of a physical memory location in a flash memory device in memory store 6, such as flash memory device 12-01 or 12-02. This physical memory location is used as the target physical memory location for reading or writing data that is associated with an LBA set that is mapped to the PBA associated with the memory index. A physical memory location is disposed to have a size, named "physical memory location size", that is at least equal to the LBA set size of this LBA set.

A physical memory location is comprised of one or more programmable portions. For example, if flash memory device 12-01 includes flash blocks that have programmable portions with a programming size of 512 B, then each programmable portion may be associated with a unique memory index that represents the starting address boundary of each programmable portion in the flash memory device. A memory index of 0x00 may be used to represent the starting address boundary of a first 512 B programmable portion, a memory index of 0x01 may be used to represent the starting boundary of a second 512 B programmable portion, and so on until the last available programmable portion in a flash memory device is associated with a memory index. These programmable portions have a programming size that is equal to or less than the minimum erase size of a flash memory device. Since some flash memory devices are erasable by flash block, implementations that use flash memory devices may be implemented with a programming size that is less than or equal to the flash block size.

In the embodiment shown in FIG. 2, memory index fields 32 are initialized to represent the memory indices of physical memory locations that are respectively comprised of more than one programmable portion, named portion set. Although more than one programmable portion comprises each physical memory location, a single memory index is used to represent each physical memory location in each memory index field 32. Each of these memory indices represents a starting address boundary of a programmable portion that is from a portion set associated with a physical memory location and that is the lowest of the other memory indices associated with the programmable portions in the portion set. The number of programmable portions comprising a physical memory location is a function of the programming size of these programmable portions and the LBA set size used. Each of these memory indices represented in memory index fields 32, respectively, are used to represent the starting boundary of a physical memory location that spans across the portion set comprising the physical memory location. For example, if LBA set 40 has an LBA set size of 4 KB, and flash device 12-01 uses flash blocks having flash block sizes of 16 KB and a programmable portion size of 512 B, then the memory indices represented in memory index fields 32 would differ by at least by the size of the LBA set, such as 0x00, 0x08, 0x16, 0x24, and so on. Each of these memory indices represents the starting boundary of a physical memory location that spans across eight programmable portions. In effect, each of these memory indices functions as a physical memory address for a physical memory location that has a size equal to eight programmable portions.

In an alternative embodiment (not shown), if each physical memory location is comprised to have only one programmable portion, then each memory index that represents the starting address boundary of a physical memory location spans across only one programmable portion. Each memory index would differ by a single programmable portion size. For instance, if the programmable portion size is 512 B, then each memory index represented by memory index fields 32 would differ by at least 512 B, such as 0x00, 0x01, 0x02, and so on. In addition, mapping table 9 is initialized so that two different LBA sets are not mapped to the same PBA.

Assigning a single index for each starting address boundary of a programmable portion having a 512 B programmable portion size is not intended to be limiting in any way. One of ordinary skill in the art after receiving the benefit of the herein disclosure would readily recognize that other indexing methods may be used. For instance, in yet another alternative embodiment (not shown), each index may be used to represent a byte of memory, which renders the flash memory devices in memory store 6 byte addressable in mapping table 9. This alternative approach results in indices, such as 0x0000, 0x1000, 0x2000 and so on, that have widths sufficient to represent the starting address boundaries of physical memory locations which have a physical memory location size sufficient to hold data represented by an LBA set size of 4K.

During operation and after initialization of mapping table 9, if storage device controller 22 receives an I/O transaction request 20 from host 18, storage device controller 22 processes I/O transaction request by transferring it to DMA controller 10. After receiving I/O transaction request 20, DMA controller 10 uses mapping table 9 to determine which PBAs are mapped to LBAs used in I/O transaction request 20. DMA controller 10 uses the PBAs to determine which addressable physical memory locations to use when performing memory operations requested by host 18 through I/O transaction request 20. Mapping table 9 associates LBA sets to PBAs in a manner that increases the likelihood that memory operations resulting from I/O transaction request 20 will be optimized by distributing these memory operations across different storage device resources that are associated with these PBAs, such as across different FDEs, different buses, different flash memory devices, or any combination of these.

For example, still referring to FIGS. 1 and 2, I/O transaction request 20 may be in the form of a write transaction that targets LBAs 00-07 and 08-15. An I/O transaction that is associated with consecutive LBAs is sometimes referred to as a sequential I/O transaction. Since mapping table 9 has been initialized to map these LBAs 00-07 and LBAs 08-15 with LBA sets 40 and 42, respectively, DMA controller would more than likely be able to perform memory operations required by I/O transaction request 20 in an optimal manner by interleaving these memory operations across different buses, different FDEs, different flash memory devices, or any combination of these. Since in the example shown in FIG. 2, PBAs that are mapped to adjacent LBA sets have different Bus, FDE, flash device group identifiers or any combination of these, DMA controller 10 may interleave by Bus, FDE, or flash memory device. In one embodiment of the present invention, if interleaving may be performed through more than one access parameter, DMA controller 10 prioritizes interleaving first by Bus, then by FDE and then by flash memory device.

Using different group identifiers, such as group identifiers 15-0 and 15-1 in mapping table 9, enables the interleaving of memory operations across flash devices that are controlled by the same FDE. Stated another way, using different group identifiers enables interleaving memory operations across flash devices that belong to the same flash array bank interleave. Using different FDE identifiers in mapping table 9 enables interleaving memory operations across flash memory devices that are controlled by different FDEs, while using different bus identifiers enables interleaving memory operations across flash memory devices that are coupled to different flash bus interfaces.

While the present invention has been described in particular embodiments, it should be appreciated that the present invention should not be construed as limited by such embodiments. Rather, the present invention should be construed according to the claims below.

We claim:

1. A mapping table for optimizing memory operations performed by an electronic storage device in response to receiving an I/O transaction request initiated by a host, said mapping table comprising:

a set of logical fields, including a first logical field and a second logical field, and said logical fields respectively disposed for representing a plurality of LBA sets, including said first logical field disposed for representing a first LBA set and said second logical field disposed for representing a second LBA set, said first and second LBA sets each representing a set of consecutive LBAs;

a set of PBA fields, including a first PBA field and a second PBA field, said set of PBA fields respectively disposed for representing a set of PBAs, including a first PBA disposed for representing a first set of access parameters and a second PBA disposed for representing a second set of access parameters, said PBAs each associated with a physical memory location in a memory store, said set of logical fields and said set of PBA fields disposed to associate said first and second LBA sets with said first and second PBAs; and wherein, in response to receiving the I/O transaction request, said mapping table causes the electronic storage device to perform optimized memory operations on memory locations respectively associated with said first PBA and said second PBA, if the I/O transaction request is associated with said first and second LBA sets.

2. The mapping table of claim 1, wherein:
said first and second LBA sets are adjacent LBA sets;
said first and second access parameters are different; and
said LBAs from said first and second LBA sets are logical block addresses used by the host for addressing said data.

3. The mapping table of claim 1, wherein an LBA having the lowest LBA value from said second LBA set is consecutive with an LBA having the highest LBA value from said first LBA set.

4. The mapping table of claim 1, wherein an LBA having the lowest LBA value from said second LBA set is not consecutive with an LBA having the highest LBA value from said first LBA set.

5. The mapping table of claim 1, wherein:
data stored at a first physical memory location, which is addressable using said first PBA, is transferred to a second physical memory location, which is addressable using said second PBA, said data transferred in portions equal to a section size.

6. The mapping table of claim 5, wherein:
said first and second LBA sets respectively have an LBA set size equal to said section size.

7. The mapping table of claim 5, wherein:
said memory store includes a plurality of flash memory devices that each have a native page size; and
said section size is at least equal to a product of a positive integer multiplied by said native page size, and said integer is at least equal to one.

8. The mapping table of claim 5, wherein:
said memory store includes a plurality of flash memory devices that each have a native page size and a plurality of flash blocks, and that supports more than one page write that can be performed on a page from one of said flash blocks before requiring an erase cycle to be performed on said one of said flash blocks; and
said section size is at least equal to a quotient resulting from dividing said native page size by said more than one page write.

9. The mapping table of claim 1, wherein said set of access parameters includes a bus identifier, an FDE identifier and a group identifier.

10. The mapping table of claim 9, wherein said first and second PBA include different bus identifiers, different FDE identifiers and different group identifiers.

11. The mapping table of claim 9, wherein said first and second PBA respectively include different combinations of said bus identifiers, said FDE identifiers, and said group identifiers.

12. The mapping table of claim 1, wherein said first and second PBA include different bus identifiers.

13. The mapping table of claim 1, wherein said first and second PBA include different FDE identifiers.

14. The mapping table of claim 1, wherein said first and second PBAs respectively include a first group identifier and a second group identifier.

15. The mapping table of claim 1:
wherein said memory store includes a set of solid state memory devices that are coupled to a set of buses and that are controlled by a set of FDEs; and
wherein said access parameter includes a group identifier for identifying at least a portion of said set of memory devices that are respectively controlled by different FDEs from said set of FDEs.

16. The mapping table of claim 1, wherein:
said memory store includes a first set of memory devices controlled by a first FDE and a second set of memory devices controlled by a second FDE; and
said first and second sets of memory devices associated with a plurality of group identifiers in which no two of said group identifiers is the same, and each memory device from said first set of memory devices is respectively associated with different group identifiers from said plurality of group identifiers.

17. The mapping table of claim 1, wherein:
said electronic storage device includes a storage device controller, said memory store, and a memory system;
said memory system includes a flash buffer controller, a first set of FDEs, a second set of FDEs, and a set of buses that includes a first bus and a second bus;
said memory store includes a first set of memory devices and a second set of memory devices, said first and second set of memory devices respectively coupled to said first and second buses;
said first set of FDEs disposed to control said first set of memory devices through said flash buffer controller and said first bus, said first set of FDEs including a first FDE and a second FDE;
said second set of FDEs disposed to control said second set of memory devices through said flash buffer controller and said second bus, said second set of FDEs including a third FDE and a fourth FDE;
said first and second set of memory devices are associated with a plurality of memory device groups, including a first group and a second group;
wherein said first and second groups corresponding respectively to said first and second group identifiers; and
wherein said first and second PBAs respectively include said first and second group identifiers.

18. The mapping table of claim 17, wherein said first and third memory devices are associated with a first group identifier and said second and fourth memory devices are associated with a second group identifier.

19. The mapping table of claim 17, wherein said first and second memory devices include non-volatile solid state memory cells.

20. The mapping table of claim 17, wherein each memory device from said first set of memory devices are respectively associated with different group identifiers.

21. The mapping table of claim 1, wherein said first PBA further disposed to represent a memory index.

22. A memory system for optimizing memory operations in an electronic storage device responsive to an I/O transaction request initiated by a host, said electronic storage device including a memory store having a set of memory devices including a first memory device, a second memory device, a third memory device and a fourth memory device, said memory system comprising:
a flash buffer controller, a set of FDEs, and a set of buses, wherein said set of FDEs including a first FDE, a second FDE, a third FDE, and a fourth FDE and wherein said buses including a first bus and a second bus, said first bus coupled to the first and second memory devices, and the second bus coupled to said third and fourth memory devices;
said first and second FDEs coupled to said first bus through said first buffer controller, and said third and fourth FDEs coupled to said second bus through said first buffer controller;
said set of memory devices are partitioned into memory device groups, including a first group and a second group;
a mapping table that includes:
a set of logical fields, including a first logical field and a second logical field, and said logical fields respectively disposed for representing a plurality of LBA sets, including said first logical field disposed for representing a first LBA set and said second logical field disposed for representing a second LBA set, said first and second LBA sets each representing a set of consecutive LBAs;
a set of PBA fields, including a first PBA field and a second PBA field, said set of PBA fields respectively disposed for holding a set of PBAs, including a first PBA disposed for representing a first set of access parameters and a second PBA disposed for representing a second set of access parameters, said PBAs each associated with a physical memory location in a memory store, said set of logical fields and said set of PBA fields disposed to associate said first and second LBA sets with said first and second PBAs; and
wherein, in response to receiving the I/O transaction request, said mapping table causes the storage device to perform optimized memory operations on memory locations respectively associated with said first PBA and said second PBA, if the I/O transaction request is associated with said first and second set of consecutive LBAs.

23. The memory system of claim 22, wherein an LBA having the lowest LBA value in said second LBA set is consecutive with an LBA having the highest LBA value from said first LBA set.

24. The memory system of claim 22, wherein said first and third memory devices correspond to a first group identifier and said second and fourth memory devices correspond to a second group identifier.

25. The memory system of claim 22, wherein said optimized memory operations include a first memory operation performed using said first PBA and a second memory operation performed using said second PBA; said first and second PBAs respectively associated with a first set of access parameters and a second set of access parameters, and said set of first and second set of access parameters differing by at least one access parameter.

26. The memory system of claim 25, wherein said first and second set of access parameters respectively including a bus identifier, an FDE identifier and a group identifier.

27. The memory system of claim 26, wherein said first and second PBAs respectively include said first and second group identifiers.

28. The memory system of claim 22, wherein said PBA further includes a memory index.

29. The memory system of claim 22, wherein:
data stored at said first physical memory location is moved to said second physical memory location using a minimum transfer size granularity that is equal to a section size; and
said first and second LBA sets respectively have an LBA set size equal to said section size.

30. The mapping table of claim 29, wherein:
said memory store includes a plurality of flash memory devices that each have a native page size; and
said section size is at least equal to a product of a positive integer multiplied by said native page size, and said integer is at least equal to one.

31. The mapping table of claim 29, wherein:
said memory store includes a plurality of flash memory devices that each have a native page size and a plurality of flash blocks, and that permit a number of write operations to be performed on a page from one of said flash blocks before requiring an erase cycle to be performed on said flash block, said number of write operations equal to at least two; and
said section size is at least equal to said native page size divided by said number of write operations.

32. An electronic storage device that includes a memory system that uses a memory table for increasing the likelihood that an operational load imposed on the storage apparatus during the processing of an I/O transaction request will be optimally distributed across storage device resources, said I/O transaction request received by said storage device from a requesting host, said electronic storage device comprising:
a mapping table which maps a first LBA set to a first PBA, and a second LBA set to a second PBA, said first and second LBA sets including respective sets of consecutive LBAs;
a memory store that includes a set of flash devices, said set of flash devices includes a first physical memory location and a second physical memory location that are addressable by said first and second PBAs respectively;
a memory system coupled to said memory store and disposed to use said mapping table during a memory operation;
wherein said first PBA includes a first set of access parameters and said second PBA includes a second set of access parameters, and at least one difference between said first and second PBAs; and
wherein said mapping table increases the likelihood that that the operational load imposed on the storage apparatus during the processing of the I/O transaction request will be optimally distributed across storage device resources.

33. The electronic storage device of claim 32, wherein an LBA having the lowest LBA value in said second LBA set is consecutive with an LBA having the highest LBA value from said first LBA set.

34. The electronic storage device of claim 32, wherein the processing of the I/O transaction request includes a first memory operation performed using said first PBA and a second memory operation performed using said second PBA; said first and second PBAs respectively associated with a first set of access parameters and a second set of access parameters, and said set of first and second set of access parameters differing by at least one access parameter.

35. The memory system of claim 34, wherein said first and second set of access parameters respectively including a bus identifier, an FDE identifier, and a group identifier.

36. The memory system of claim 35, wherein said first and second PBAs respectively include said first and second group identifiers.

37. The electronic storage device of claim 32, wherein said PBA further includes a memory index.

38. The electronic storage device of claim 32, wherein:
data stored at said first physical memory location is moved to said second physical memory location using a minimum transfer size granularity that is equal to a section size; and
said first and second LBA sets respectively have an LBA set size equal to said section size.

39. The mapping table of claim 38, wherein:
said memory store includes a plurality of flash memory devices that each have a native page size; and
said section size is at least equal to a product of a positive integer multiplied by said native page size, and said integer is at least equal to one.

40. The mapping table of claim 38, wherein:
said memory store includes a plurality of flash memory devices that each have a native page size and a plurality of flash blocks, and that permit a number of write operations to be performed on a page from one of said flash blocks before requiring an erase cycle to be performed on said flash block, said number of write operations equal to at least two; and
said section size is at least equal to said native page size divided by said number of write operations.

* * * * *